United States Patent
Taylor et al.

(10) Patent No.: US 11,736,471 B2
(45) Date of Patent: *Aug. 22, 2023

(54) METHOD OF RE-ASSIGNING ADDRESS TO NETWORK DEVICE

(71) Applicant: Argo AI, LLC, Pittsburgh, PA (US)

(72) Inventors: Christopher Scott Taylor, Palo Alto, CA (US); Brian Margosian, Lathrup Village, MI (US); Alexander Cline, Pittsburgh, PA (US)

(73) Assignee: ARGO AI, LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,803

(22) Filed: Dec. 5, 2022

(65) Prior Publication Data

US 2023/0100144 A1 Mar. 30, 2023

Related U.S. Application Data

(63) Continuation of application No. 17/125,166, filed on Dec. 17, 2020, now Pat. No. 11,563,731.

(51) Int. Cl.
*G06F 7/04* (2006.01)
*H04L 9/40* (2022.01)
*G07C 5/00* (2006.01)

(52) U.S. Cl.
CPC .......... *H04L 63/0823* (2013.01); *G07C 5/008* (2013.01); *H04L 63/0876* (2013.01)

(58) Field of Classification Search
CPC ... H04L 9/3242; H04L 9/3268; H04L 9/3263; H04L 9/0866; H04L 63/0876; H04L 63/083; H04W 12/069; G07C 5/008
See application file for complete search history.

(56) References Cited

U.S. PATENT DOCUMENTS

| | | |
|---|---|---|
| 9,305,407 B1 | 4/2016 | Walton et al. |
| 9,646,290 B2 | 5/2017 | Walton et al. |
| 9,654,458 B1 * | 5/2017 | Bhaktwatsalam .. H04L 63/1466 |
| 10,733,160 B1 | 8/2020 | Leise et al. |
| 2009/0254240 A1 | 10/2009 | Olsen, III et al. |
| 2009/0259841 A1 * | 10/2009 | Laberteaux ......... H04L 63/0823 713/156 |
| 2009/0265455 A1 | 10/2009 | Hiraki |

(Continued)

OTHER PUBLICATIONS

Baldini et at al, Identity-based Security Systems for Vehicular Ad-hoc Networks, IEEE, Dec. 6, 2013, pp. 672-678. (Year: 2013).*

(Continued)

*Primary Examiner* — Philip J Chea
*Assistant Examiner* — Jenise E Jackson
(74) *Attorney, Agent, or Firm* — Fox Rothschild LLP

(57) ABSTRACT

A system for communicating with multiple vehicles or other electronic devices that share a common media access control (MAC) or other address is disclosed. Upon receiving a certificate signing request (CSR) from a connected device and determining that the device does not have a unique address, the system will generate a unique address for the device and embedding the unique addresses in a certificate, sign the certificate, and transfer the certificate to the device. Then, when the system communicates with the device, the system may use that unique address to identify the device.

20 Claims, 4 Drawing Sheets

(56) References Cited

U.S. PATENT DOCUMENTS

| | | |
|---|---|---|
| 2014/0282467 A1 | 9/2014 | Mueller et al. |
| 2014/0328248 A1* | 11/2014 | Greubel ................ H04W 8/005 370/328 |
| 2015/0281347 A1* | 10/2015 | Wang .................. G06F 9/45533 709/203 |
| 2016/0087804 A1 | 3/2016 | Park et al. |
| 2016/0285864 A1* | 9/2016 | Canavor ............. H04W 12/069 |
| 2018/0144322 A1* | 5/2018 | Unnerstall ............ G07F 13/025 |
| 2019/0043360 A1* | 2/2019 | Weinfield .............. H04W 24/06 |
| 2019/0066407 A1 | 2/2019 | Kwak |
| 2019/0197798 A1 | 6/2019 | Abari et al. |
| 2019/0306149 A1 | 10/2019 | Vazquez Vidal et al. |
| 2020/0033847 A1* | 1/2020 | Way ....................... G07C 5/008 |
| 2020/0244655 A1 | 7/2020 | Gundavelli et al. |
| 2021/0226802 A1* | 7/2021 | Zhu ..................... H04L 63/0823 |

OTHER PUBLICATIONS

Coronado et al, Service Discovery and Service Access in Wireless Vehicular Networks, IEEE, Dec. 4, 2008, pp. 1-6. (Year: 2008).*
Partial European Search Report for European Patent Application No. 22198159.0 dated Feb. 23, 2023, 15 pages.
Google Groups, "MAC Address Binding to the Certificate" available at: https://groups.google.com/g/mailing.openssl.users/c/20ehH_uWARU?pli=1 printed on Sep. 16, 2020.
Wikipedia, "Dynamic Host Configuation Protocol", available at: https://en.wikipedia.org/wiki/Dynamic_Host_Configuration_Protocol printed on Dec. 15, 2020.
Deliotte, "Accelerating Technology Deisruptions in the Automotive Market, Blockchain in the Automotive Industry" 2018.

* cited by examiner

METHOD OF RE-ASSIGNING ADDRESS TO NETWORK DEVICE

RELATED APPLICATIONS AND CLAIM OF PRIORITY

This patent document claims priority to, and is a continuation of, U.S. patent application Ser. No. 17/125,166, filed Dec. 17, 2020, the disclosure of which is fully incorporated into this document by reference.

BACKGROUND

In order for electronic devices to communicate with each other on a network, each device must have a unique address. For example, electronic devices that have a network interface card (NIC) or other network adapter are typically assigned a hardware address that is known as a media access control (MAC) address. A MAC address is typically hard-coded into the NIC and includes a sequence of numbers and/or letters that network devices may use to direct messages to, and identify the source of messages from, other network devices. MAC addresses may be configurable after manufacturing by a device owner.

Hardware addresses such as MAC addresses are typically assigned to, and encoded into, electronic devices at the time of manufacture. Many MAC addresses start with an organizationally unique identifier (OUI), which is a sequence of characters that identifies the manufacturer. The remaining characters of the MAC address will identify the device. For example, a network adapter manufactured by Cisco may have the MAC address 00-14-22-01-23-45, in which the first three octets/first six characters (00-14-22) make up the OUI that identifies Cisco as the manufacturer, while the final three octets/final six characters uniquely identify the device.

Once assigned, a MAC address typically does not change. This makes a MAC address useful to help direct messages from particular devices, to help identify the device from which a message is received, and to help diagnose network issues.

However, in some manufacturing scenarios, multiple devices leaving the manufacturing facility may have the same MAC address. This is common in vehicle manufacturing, in which a particular vehicle original equipment manufacturer (OEM) will assign a common MAC address to the network adapters of several or all vehicles that are of the same make and model. This can create issues for entities that manage fleets of vehicles, entities that maintain or update software in multiple vehicles, or entities that service vehicles, because multiple vehicles sharing a common MAC address may be connected to the service entity's network at the same time.

This document describes methods and systems that are directed to addressing the problems described above, and/or other issues.

SUMMARY

In various embodiments, a service provider system such as a vehicle fleet management system assigns media access control (MAC) addresses or other hardware addresses to vehicles and/or other electronic devices that connect to the system. The assignment may be, for example, that of a new address to a vehicle that already has an encoded address. In this method, a vehicle or other electronic device will communicatively connect to an access portal of the service provider system, and send its identification code (such as a vehicle identification number) for the electronic device to the service provider system via the access portal. The service provider system will use the identification code to determine whether a unique address is assigned to the electronic device. If an address is assigned to the electronic device and the assigned address is unique (that is, not shared with other devices), then the service provider system will embed the assigned address in a certificate. If the electronic device is not determined to have a unique address, the service provider system will generate a unique address for the electronic device and embed it in the certificate. The service provider system will then transfer the certificate to the electronic device via the access portal.

The vehicle or other electronic device will then perform an initialization process that includes verifying validity of the certificate, extracting the unique address from the certificate, and applying the unique address to a network adapter of the electronic device. The vehicle or other electronic device will then use the network adaptor to maintain a communicative connection with the access portal and exchange data with the service provider system.

In some embodiments, the service provider system may maintain a data store with a data set that includes a mapping of multiple identification codes to multiple unique addresses. If so, then when determining whether an address is assigned to the electronic device the system may access the data store and determine whether the identification code for the electronic device is mapped to a unique address in the data store.

In some embodiments, the electronic device may transfer the identification code to the service provider system with a certificate signing request (CSR) that includes the identification code. In addition, the electronic device may issue the CSR as part of a commissioning process in which the electronic device is communicatively connected to the service provider system for a first time.

After the electronic device is assigned a unique address, it may re-connect to the service provider system at a later time. Upon re-connecting to the service provider system, the device may present the unique address to the service provider system.

This disclosure is not limited to generation of a single address per device. In some embodiments, the system may generate multiple unique addresses for a connected electronic device. If so, the system may embed each of a device's unique addresses in a single certificate. Or, the system may generate multiple certificates and embed each of the unique addresses in a respective one of the certificates.

In an additional embodiment, to assign a hardware address to a vehicle, a service provider system may, as part of a commissioning process for the vehicle, detect that the vehicle has communicatively connected to an access portal of the service provider system. The system may receive, via the access portal from the vehicle, a certificate signing request (CSR) with an identification code for the vehicle. The system may generate a unique address for the vehicle and embed the unique address in a certificate. The system may then transfer the certificate to the electronic device via the access portal. The vehicle may then extract the unique address from the certificate, apply the unique address to a network adapter of the electronic device, and use the network adaptor to maintain a communicative connection with the access portal and exchange data with the service provider system.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

Figure 1:
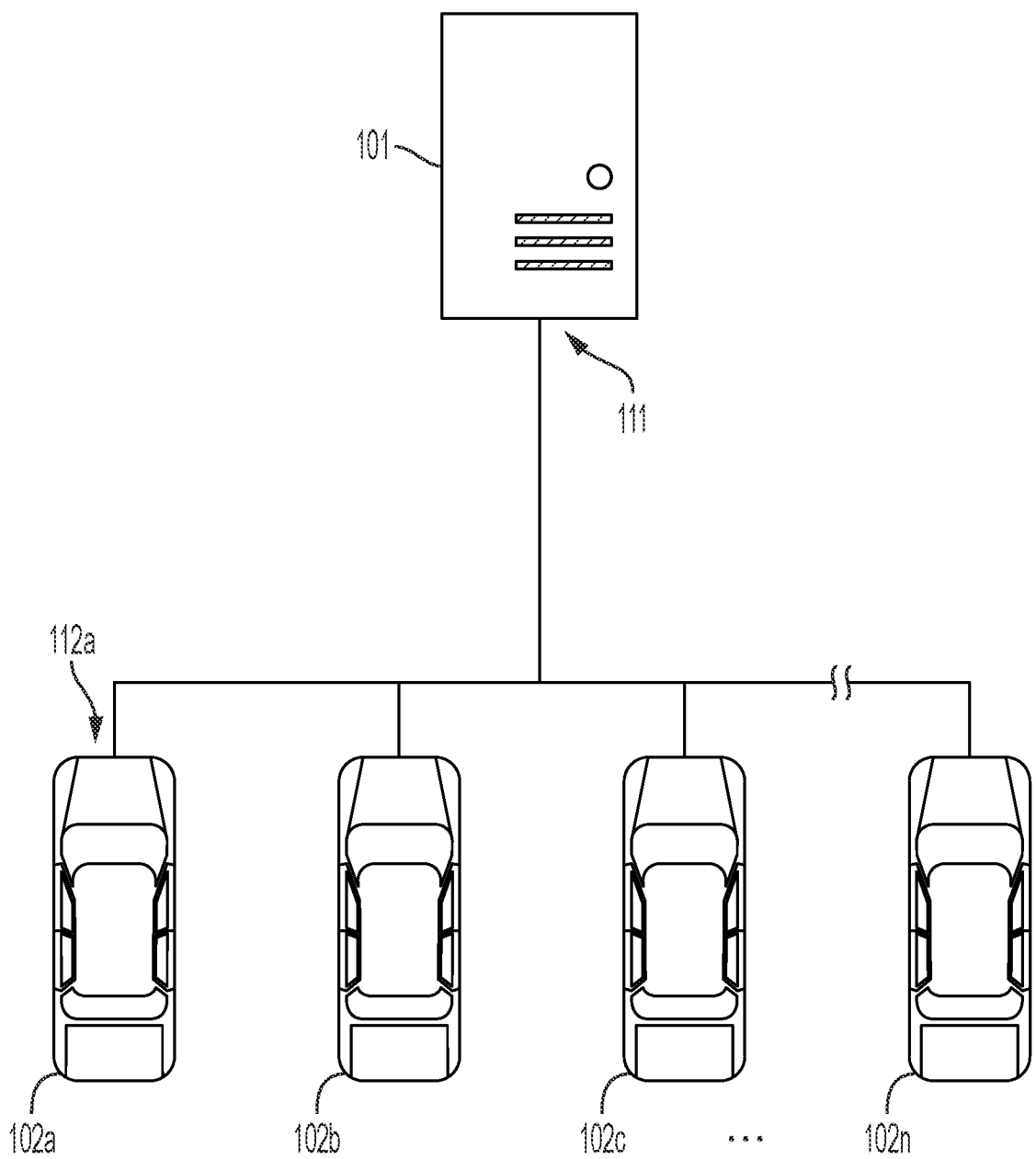
FIG. 1 illustrates example components of an address assignment system.

FIG. 1 illustrates an example system in which any number of electronic devices 102a ... 102n are communicatively connected to a service provider system 101. In this case, the electronic devices 102a ... 102n are vehicles, such as automobiles, and the service provider system 101 is a system including one or more services that will (a) transfer software updates and data to the electronic devices 102a ... 102n, and (b) optionally receive data from the electronic devices 102a ... 102n. The service provider system 101 may be a fleet management system, such a system that serves a fleet of autonomous vehicles by providing software updates, training data, machine learning models and/or other data to the vehicles. Alternatively, the service provider system may be an independent service operator, such as a parking garage operator, a vehicle service station or other operator that receives software updates and data from external services and transfers that material to vehicles when the vehicles connect to the independent service operator's system.

Each electronic device (such as electronic device 102a) will include a communication port 112a via which the device communicatively connects to the network of the service provider system 101. Similarly, one or more servers of the service provider system 101 will include any number of communication ports 111 that operate as access portals to the service provider system. The ports may be communication ports that are configured for a wired connection, such as an Ethernet port having a socket and contacts that are positioned to receive an Ethernet cable. In some embodiments, some or all of the ports may be configured for wireless connection, as in a BLUETOOTH or Wi-Fi connection, in which case the port would not include a socket but instead would include a transceiver that is configured to send and receive data wirelessly.

As noted above, vehicle OEMs commonly assign a common MAC address to the network adapters of multiple vehicles. However, this disclosure is not limited to vehicles, and similar issues will occur if multiple electronic devices that are connected to a network share a common hardware address. An address conflict between multiple devices can lead to a fault condition in a network switch, as the switch will not be able to precisely determine which port to which it must send data. Alternatively, an address conflict may cause data to be transferred to an incorrect device, as a switch may simply transfer data to all devices that share a common address.

Figure 2:
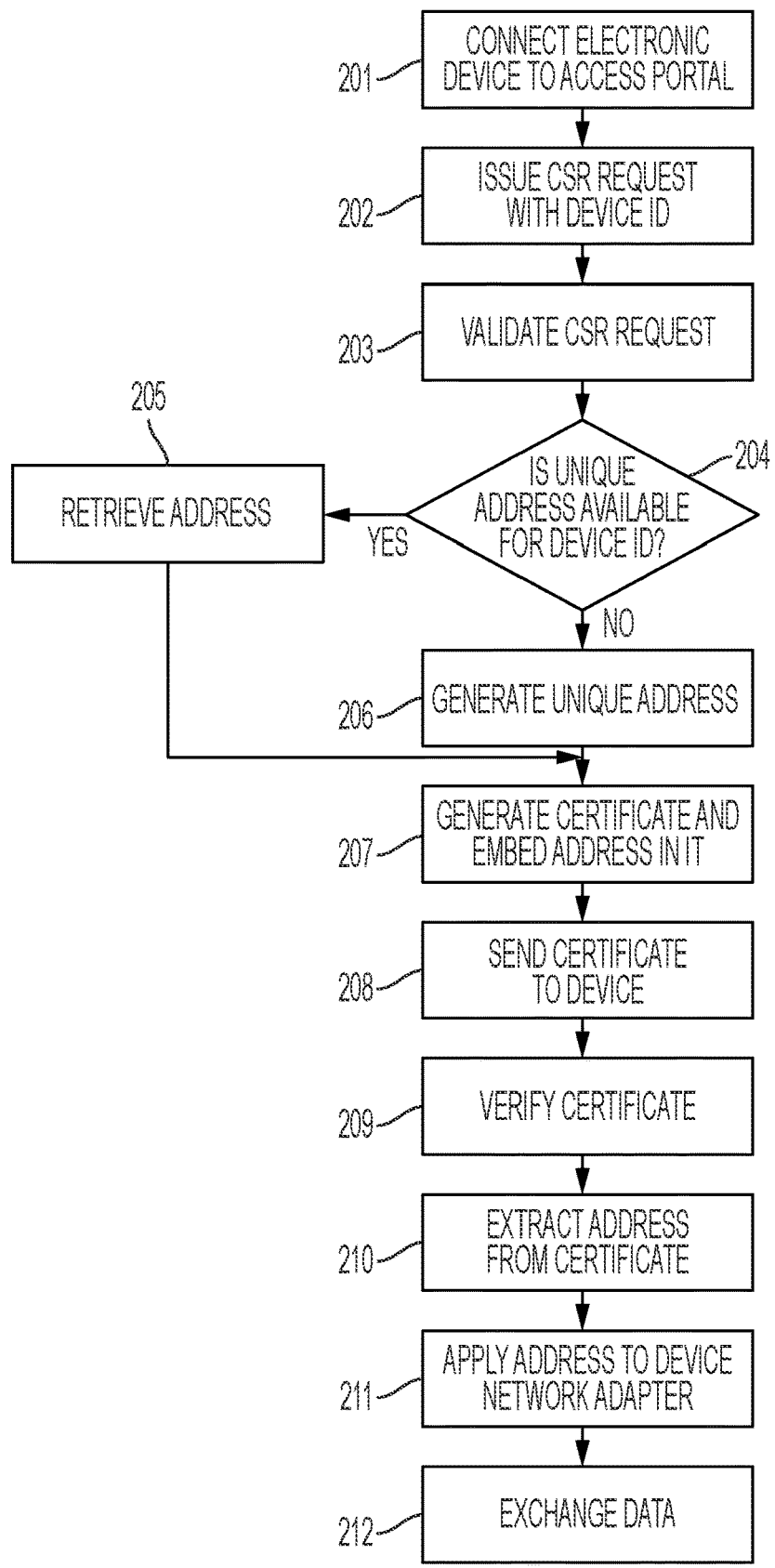
FIG. 2 is a flowchart that illustrates an example address assignment process.

A method to address this is now described, with reference to FIG. 2. At 201 an electronic device will communicatively connect to an access portal of a service provider system. As noted above, this may occur when a vehicle's communication port is plugged into an Ethernet, RS-232 or other data transfer connection of a service provider, such as that of a fleet management service. However, this disclosure is not limited to wired connections, and wireless connections that use BLUETOOTH, Bluetooth 2.0, Wi-Fi, vehicle-to-infrastructure (V2I), vehicle-to-network (V2N), or other near-field or short range communication protocols.

At 202 the electronic device will transmit the device's identification code to the service provider system via the communication link. In the case of an electronic device that is a vehicle, the identification code may be the device's vehicle identification number (VIN), which is a sequence of alphanumeric characters that uniquely identifies the vehicle, as assigned by the vehicle's manufacturer.

If the device is connecting to a service provider system for the first time (as in a vehicle commissioning process), or if the device is undergoing a re-commissioning or updated commissioning process, the device may transmit its identification code to the service provider by issuing a certificate signing request (CSR) to the service provider via the access portal, and including the identification code in the CSR. A CSR is a message by which the device requests a digital identity certificate from the service provider system's public key infrastructure (PKI). The CSR will contain a public key of the electronic device to which the service should issue a certificate (i.e., the public portion of the public-private key pair generated by the electronic device), along with the VIN or other identification code (ID) of the electronic device. The CSR may follow any now known or future developed protocol for CSRs, such as that contained in generally accepted Public Key Cryptography Standards (PKCS) that are in effect at the time of the request. The electronic device will digitally sign the CSR with its private key.

Upon detecting that a vehicle or other electronic device has connected and receiving the CSR or other message with the device's ID, at 203 the service provider system—in this situation acting as a registration authority—will examine the certificate and verify that the device is entitled to receive a digital certificate from the service provider system. The service provider system may do this using any suitable validation method, including but not limited to (a) a method that checks data in the CSR (such as the ID) and determines whether the data matches that of a known device, and/or (b) an extended validation method in which a human operator enters a validation based on knowledge that the electronic device is a known device (as in a fleet management system).

As part of this process, or in a separate step, at 204 the service provider system also may determine whether the service provider system has already assigned a unique address to the electronic device. The service provider system will include a data store that contains a mapping of unique addresses to known device IDs. The service provider system may access the data store and determine whether the data store includes the ID for the electronic device, and if so (204: YES), the service provider system will return the unique address that the data store maps to that device ID.

If the device's ID is not in the data store (204: NO), or if the device's ID is associated with device address that is not unique (i.e., it is an address that is shared by multiple connected devices), then at 205 the system may generate a unique address for the device using any suitable rule set, such as a random number generator, a process that assigns a sequence of codes in sequence, or a process in which the system includes a repository of available addresses and selects one of those available addresses from the repository.

Optionally, the address may include a prefix that serves as an object identifier for the electronic device, such as an OUI for the device's manufacturer, owner and/or fleet of which the device is a part. Regardless of the address generation process, once the system returns or generates the unique address, at 207 the service provider system—in this instance acting as a certificate authority—will generate a signed digital certificate in which the unique address is embedded, such as in a certificate extension. At 208 the system will return the digital certificate to the electronic device.

Optionally, in step 205 the system may generate multiple unique addresses for the electronic device. If so, then when generating the certificate at 207 the certificate authority may embed each unique address in the certificate. Alternative, the certificate authority may generate multiple certificates (that is, one certificate per address) at 207, and at 208 the system may return each of the certificates to the electronic device.

After the electronic device receives the certificate, the device will perform an initialization process that includes: (a) at 209 verifying validity of the certificate; (b) at 210 extracting the unique address from the certificate; and (c) at 211 applying the unique address to a network adapter of the electronic device.

The process of verifying validity of the certificate (step 209) may include certificate path validation using the device's certificate and trusted certificate authority intermediate and root certificates. Any suitable certification path validation algorithm may be used for this step, such as that defined in RFC 5280. The process also may include decoding the signature of the signed device certificate and verifying it was signed by the certificate authority's public key, and/or verifying the subject named in the certificate matches the ID for the electronic device. If the electronic device cannot verify validity of the certificate, it may be programmed to not accept data from, or transfer data to, the certificate authority (i.e., to the service provider server).

The process of extracting the unique address from the certificate (step 210) may include decoding the formatting of the certificate and extracting the electronic device's unique address along with additional values embedded in the certificate.

The process of applying the unique address to a network adapter of the electronic device (step 211) may include writing the unique address to the electronic device's software network virtualization active configuration, directly to a programming interface on the NIC, or to a configuration file.

At 212 the electronic device may then exchange data as trusted devices. In addition, when re-connecting to the system the electronic device may then present the certificate in order to enable the system to identify the device at that time.

Figure 3:
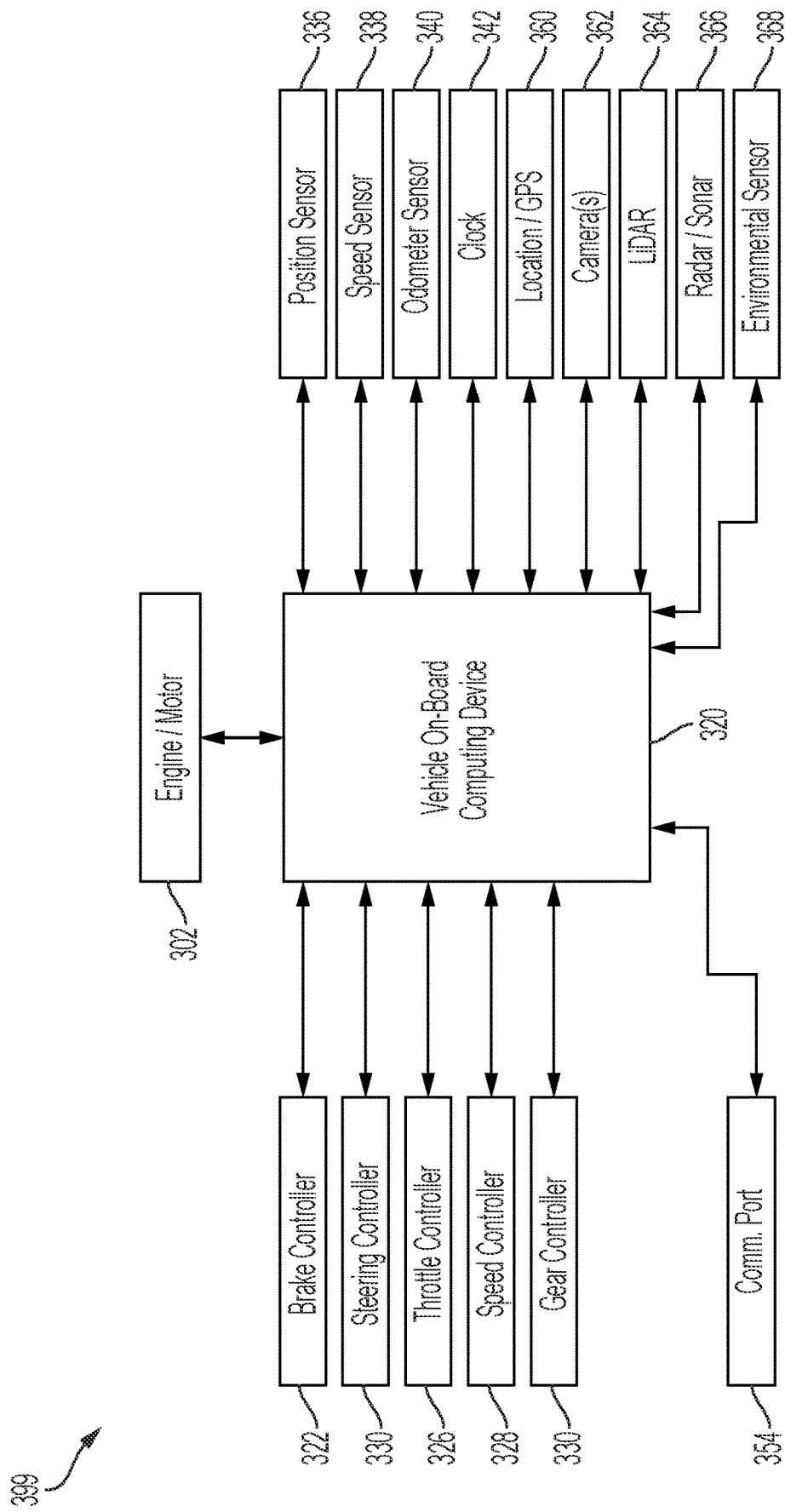
FIG. 3 is a block diagram illustrating various components of an autonomous vehicle that may receive a unique address assignment.

Optionally, the process of FIG. 3 may be performed as part of a commissioning process, such as when a vehicle is first received and commissioned into a fleet of vehicles. The commissioning process may include receiving the vehicle's VIN and storing it into a data store containing known VINs for the fleet; delivering and/or updating software, datasets and/or models to the vehicle; testing the vehicle's automation, perception, motion planning and other subsystems to ensure proper operation; and/or other processes that the vehicle is to undergo before being deployed as part of a fleet.

FIG. 3 illustrates an example system architecture 399 for a vehicle, such as an autonomous vehicle (AV), which may be any of the electronic devices 102a . . . 102n of FIG. 1. The vehicle includes an engine or motor 302 and various sensors for measuring various parameters of the vehicle and/or its environment. Operational parameter sensors that are common to both types of vehicles include, for example: a position sensor 336 such as an accelerometer, gyroscope and/or inertial measurement unit; a speed sensor 338; and an odometer sensor 340. The vehicle also may have a clock 342 that the system uses to determine vehicle time during operation. The clock 342 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 360 such as a global positioning system (GPS) device; object detection sensors such as one or more cameras 362; a LiDAR sensor system 364; and/or a radar and or and/or a sonar system 366. The sensors also may include environmental sensors 368 such as a precipitation sensor and/or ambient temperature sensor. The object detection sensors may enable the vehicle to detect moving actors and stationary objects that are within a given distance range of the vehicle 399 in any direction, while the environmental sensors collect data about environmental conditions within the vehicle's area of travel. The system will also include one or more cameras 362 for capturing images of the environment.

During operations, information is communicated from the sensors to an on-board computing device 320. The on-board computing device 320 analyzes the data captured by the sensors and optionally controls operations of the vehicle based on results of the analysis. For example, the on-board computing device 320 may control braking via a brake controller 322; direction via a steering controller 324; speed and acceleration via a throttle controller 326 (in a gas-powered vehicle) or a motor speed controller 328 (such as a current level controller in an electric vehicle); a differential gear controller 330 (in vehicles with transmissions); and/or other controllers.

Geographic location information may be communicated from the location sensor 360 to the on-board computing device 320, which may then access a map of the environment that corresponds to the location information to determine known fixed features of the environment such as streets, buildings, stop signs and/or stop/go signals. Captured images from the cameras 362 and/or object detection information captured from sensors such as a LiDAR system 364 is communicated from those sensors) to the on-board computing device 320. The object detection information and/or captured images may be processed by the on-board computing device 320 to detect objects in proximity to the vehicle.

The AV's on-board computing device 320 may use a network interface card or other network adapter to transmit any of the data to an external server for processing. The AV may receive data, software updates and the like from an external server via the port 354.

Figure 4:
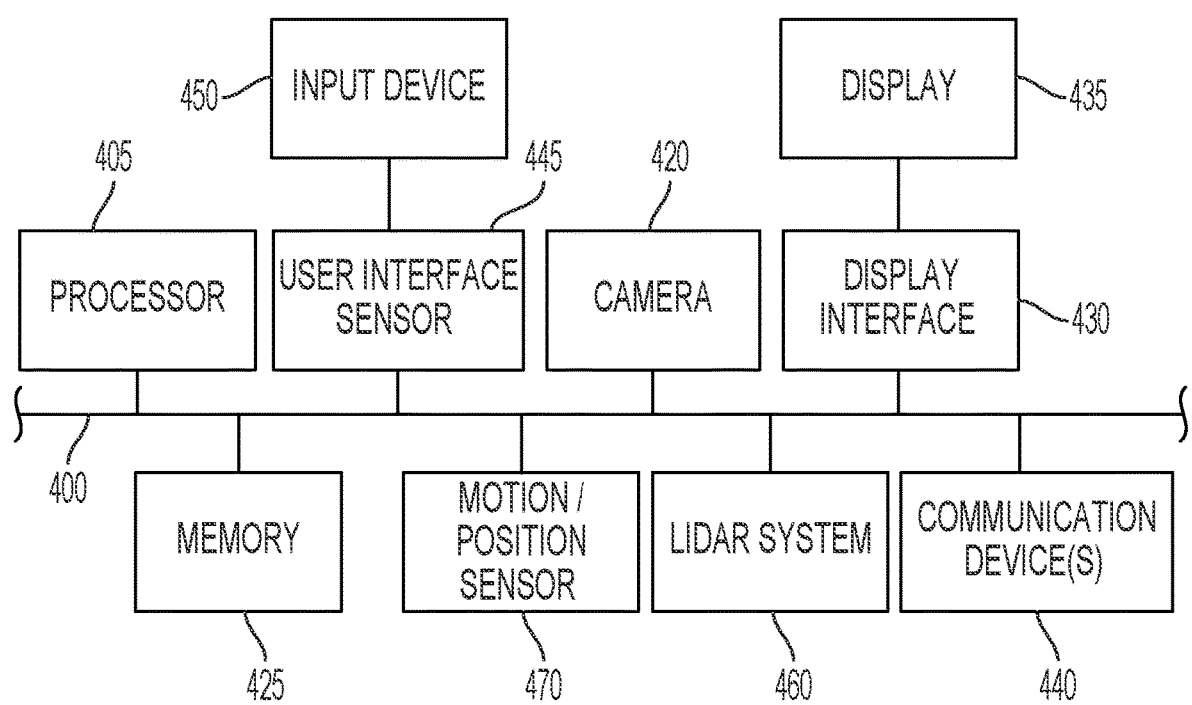
FIG. 4 is a block diagram that illustrates example components of electronic devices, such as those in vehicles and/or in servers that may assign addresses to other devices.

FIG. 4 depicts an example of internal hardware that may be included in any of the electronic components of the system, such as internal processing systems of an AV, external monitoring and reporting systems, or remote servers (such as a server of a service provider system). An electrical bus 400 serves as an information highway interconnecting the other illustrated components of the hardware. Processor 405 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 425. A memory device may include a single device or a collection of devices across which data and/or instructions are stored. Various embodiments of the invention may include a computer-readable medium containing programming instructions that are configured to cause one or more processors to perform the functions described in the context of the previous figures.

An optional display interface 430 may permit information from the bus 400 to be displayed on a display device 435 in visual, graphic or alphanumeric format, such on an in-dashboard display system of the vehicle. An audio interface and audio output (such as a speaker) also may be provided. Communication with external devices may occur using various communication devices 440 such as a wireless antenna, a radio frequency identification (RFID) tag and/or short-range or near-field communication transceiver, each of which may optionally communicatively connect with other components of the device via one or more communication system. The communication device(s) 440 may be configured to be communicatively connected to a communications network, such as the Internet, a local area network or a cellular telephone data network.

The hardware may also include a user interface sensor 445 that allows for receipt of data from input devices 450 such as a keyboard or keypad, a joystick, a touchscreen, a touch pad, a remote control, a pointing device and/or microphone. Digital image frames also may be received from a camera 420 that can capture video and/or still images. The system also may receive data from a motion and/or position sensor 470 such as an accelerometer, gyroscope or inertial measurement unit. The system also may receive data from a LiDAR system 460 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions. Alternatively, it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other advanced driver assistance systems.

The term "electronic device" refers to a device that includes a processor and memory. Each device may have its own processor and/or memory, or the processor and/or memory may be shared among multiple devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, when relative terms of order such as "first" and "second" are used to modify a noun, such use is simply intended to distinguish one item from another, and is not intended to require a sequential order unless specifically stated.

The invention claimed is:

1. A method, comprising, by a service provider system:
   detecting that a vehicle has communicatively connected to an access portal of the system,
   receiving, from an electronic device of the vehicle, an identification code, wherein receiving the identification code comprises, upon receipt of a certificate signing request (CSR) from an electronic device of the vehicle that has connected to the access portal of the system, examining the CSR and retrieving the identification code from the CSR;
   using the identification code to determine if an address is assigned to the electronic device of the vehicle;
   if an address is assigned to the electronic device of the vehicle and the assigned address is not shared with other devices, embedding the assigned address in a certificate, otherwise generating a unique address for the electronic device of the vehicle and embedding the unique address in the certificate;

transferring the certificate to the electronic device of the vehicle via the access portal for use in an initialization process; and after the electronic device of the vehicle has used the certificate to complete the initialization process, maintaining a communicative connection with the electronic device of the vehicle via the access portal and exchanging data with the electronic device of the vehicle via the communicative connection.

2. The method of claim 1, further comprising:

by the service provider system, maintaining in a data store a mapping of multiple identification codes to multiple unique addresses; and wherein using the identification code to determine if an address is assigned to the electronic device of the vehicle comprises accessing the data store and determining whether the identification code for the electronic device of the vehicle is mapped to a unique address in the data store.

3. The method of claim 1, wherein:

the electronic device of the vehicle is a control system of an autonomous vehicle; and the identification code is a vehicle identification number (VIN).

4. The method of claim 1, wherein the unique address is a media access control (MAC) address.

5. The method of claim 1, wherein the receipt of the CSR is performed as part of a commissioning process in which the electronic device of the vehicle is communicatively connected to the service provider system for a first time.

6. The method of claim 1, further comprising, by the service provider system after the electronic device of the vehicle has disconnected from the service provider system:

upon detecting that the electronic device of the vehicle has re-connected to the service provider system by receiving the unique address from the electronic device of the vehicle an additional time, continuing the communicative connection with the electronic device.

7. The method of claim 1 further comprising, by the service provider system upon determining that either no address is assigned to the electronic device of the vehicle, or that the assigned address is shared with other devices:

generating multiple unique addresses for the electronic device of the vehicle; and embedding each of the unique addresses in the certificate.

8. The method of claim 1 further comprising, by the service provider system upon determining that either no address is assigned to the electronic device of the vehicle, or that the assigned address is shared with other devices:

generating multiple unique addresses for the electronic device of the vehicle;

generating a plurality of certificates;

embedding each of the unique addresses in a respective one of the plurality of certificates; and returning each of the plurality of certificates to the electronic device of the vehicle.

9. A fleet management system for serving a fleet of vehicles, the system comprising:

a processor;

a plurality of communication ports, each of which provides an access portal for establishing a communicative connection with a corresponding vehicle;

a memory containing programming instructions that are configured to cause the processor to:

detect that a first vehicle has communicatively connected to a first one of the access portals, receive, from the first vehicle, an identification code, wherein the instructions to receive the identification code comprise instructions to, upon receipt of a certificate signing request (CSR) from the first vehicle, examine the CSR and retrieve the identification code from the CSR, use the identification code to determine if an address is assigned to the first vehicle, if an address is assigned to the first vehicle and the assigned address is not shared with other vehicles, embed the assigned address in a certificate, otherwise generate a unique address for the first vehicle and embed the unique address in the certificate, transfer the certificate to the first vehicle via the first one of the access portals for use in an initialization process, and after completion of the initialization process by the first vehicle, maintain a communicative connection with the first vehicle via the first one of the access portals and exchange data with the first vehicle.

10. The system of claim 9, wherein:

the system further comprises a data store that maintains a mapping of multiple identification codes to multiple unique addresses; and the instructions to use the identification code to determine if an address is assigned to the first vehicle comprise instructions to access the data store and determine whether the identification code for the first vehicle is mapped to a unique address in the data store.

11. The system of claim 9, wherein the identification code is a vehicle identification number (VIN).

12. The system of claim 9, wherein the unique address is a media access control (MAC) address.

13. The system of claim 9, wherein the memory further comprising additional programming instructions that are configured to cause the processor to, after the electronic device has disconnected from the service provider system:

upon detecting that the electronic device has re-connected to the system by receiving the unique address from the electronic device an additional time, continuing the communicative connection with the electronic device.

14. The system of claim 9, wherein the memory comprises additional programming instructions to, upon determining that either no address is assigned to the first vehicle, or that the assigned address is shared with other vehicles:

generate multiple unique addresses for the first vehicle; and embed each of the unique addresses in the certificate.

15. The system of claim 9, wherein the memory comprises additional programming instructions to, upon determining that either no address is assigned to the first vehicle, or that the assigned address is shared with other vehicles:

generate multiple unique addresses for the first vehicle;

generate a plurality of certificates;

append each of the unique addresses to a respective one of the plurality of certificates; and return each of the plurality of certificates to the first vehicle.

16. At least one non-transitory computer readable storage medium including computer executable instructions that, when executed by a processor, will cause the processor to, upon detecting that a first vehicle has communicatively connected to an access portal of the system and receiving receipt of a certificate signing request (CSR) from the first vehicle that has connected to an access portal:

receive, from an electronic device of the vehicle, an identification code, wherein the instructions to receive the identification code comprise instructions to, upon receipt of a certificate signing request (CSR) from the first vehicle, examine the CSR and retrieve an identification code from the CSR;

use the identification code to determine if an address is assigned to the first vehicle;

if an address is assigned to the first vehicle and the assigned address is not shared with other vehicles, embed the assigned address in a certificate, otherwise generate a unique address for the first vehicle and embed the unique address in the certificate;

transfer the certificate to the first vehicle via the access portal for use in an initialization process; and after completion of the initialization process by the first vehicle, use a communicative connection with the first vehicle via the access portal to exchange data with the first vehicle.

17. The computer readable storage medium of claim 16, wherein:

the identification code is a vehicle identification number (VIN); and the unique address is a media access control (MAC) address.

18. The computer readable storage medium of claim 16, further comprising additional programming instructions that, when executed by the processor, will cause the processor to, after the electronic device has disconnected from the service provider system:

upon detecting that the electronic device has re-connected to the system by receiving the unique address from the electronic device an additional time, continuing the communicative connection with the electronic device.

19. The computer readable storage medium of claim 16, further comprising additional programming instructions that, when executed by the processor, will cause the processor to, upon determining that either no address is assigned to the first vehicle, or that the assigned address is shared with other vehicles:

generate multiple unique addresses for the first vehicle; and embed each of the unique addresses in the certificate.

20. The computer readable storage medium of claim 16, further comprising additional programming instructions that, when executed by the processor, will cause the processor to, upon determining that either no address is assigned to the first vehicle, or that the assigned address is shared with other vehicles:

generate multiple unique addresses for the first vehicle;

generate a plurality of certificates;

append each of the unique addresses to a respective one of the plurality of certificates; and return each of the plurality of certificates to the first vehicle.

* * * * *